United States Patent
Tucker

Patent Number: 5,612,700
Date of Patent: *Mar. 18, 1997

[54] SYSTEM FOR EXTRACTING TARGETS FROM RADAR SIGNATURES

[75] Inventor: Michael Tucker, Austin, Tex.

[73] Assignee: Fastman, Inc., Austin, Tex.

[*] Notice: The term of this patent shall not extend beyond the expiration date of Pat. No. 5,504,787.

[21] Appl. No.: 559,663

[22] Filed: Nov. 20, 1995

Related U.S. Application Data

[63] Continuation of Ser. No. 443,084, May 17, 1995, Pat. No. 5,504,487.

[51] Int. Cl.$^6$ .................................................. G01S 13/00
[52] U.S. Cl. .......................... 342/90; 342/159; 342/195; 342/196
[58] Field of Search ........................... 342/90, 159, 195, 342/196

[56] References Cited

U.S. PATENT DOCUMENTS

| | | | |
|---|---|---|---|
| 5,337,053 | 8/1994 | Dwyer | 342/90 |
| 5,402,131 | 3/1995 | Pierce | 342/194 |
| 5,402,520 | 3/1995 | Schnitta | 395/22 |
| 5,451,961 | 9/1995 | Rubin et al. | 342/159 |
| 5,504,487 | 4/1996 | Tucker | 342/90 |

*Primary Examiner*—J. Woodrow Eldred
*Attorney, Agent, or Firm*—Kidd & Booth, L.L.P.

[57] ABSTRACT

The present invention discloses a system for extracting targets from radar signatures. Disclosed is a unique combination of Wavelet technology and neural networks using fractal geometry techniques that estimates the Fractal Dimension of a target even in the presence of high background noise.

18 Claims, 13 Drawing Sheets

Fractal Coastline

FIG. 4A
Narrow in Frequency
Long in time
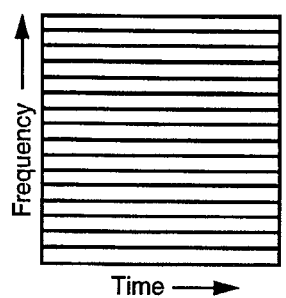
FIG. 4B
Wider in Frequency
Shorter in Time
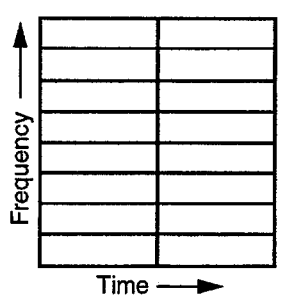
FIG. 4C
Still Shorter in Time
Wider in Frequency
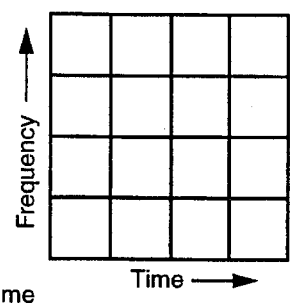
FIG. 4D
Very Short in Time
Very Wide in Frequency
FIG. 4

Decomposition and Reconstruction Pyramids for a 16 Point Signal

The Log (Base 2) of the Variance of the Wavelet Coefficients for each Scale Plotted Against the Scale for two Fractal Signals (D=1.5 and D=1.95)

SYSTEM FOR EXTRACTING TARGETS FROM RADAR SIGNATURES

The U.S. Government has a paid-up license in this invention and the right in limited circumstances to require the patent owner to license others on reasonable terms as provided for by the terms of Contract No. DAAH01-93-C-R156 awarded by U.S. Army Missile Command-Advanced Sensors Directorate.

This application is a continuation of application Ser. No. 08/443,084, filed on May 17, 1995, now U.S. Pat. No. 5,504,487.

BACKGROUND OF THE INVENTION

1. Field of the Invention

This invention pertains to the enhancement of objects in radar signal processing. More specifically, this invention pertains to using the Wavelet Transform in combination with fractal geometry techniques to estimate the fractal dimension of radar signatures in the presence of high background noise.

2. Description of the Related Art

Detecting stationary targets in a ground clutter background is a difficult problem for airborne radar sensors. Traditionally, the employed radar signal processing technique is adaptive amplitude thresholding such as constant false alarm rate (CFAR) processing that exploits the target's radar cross section for detecting the target. However, when using radar amplitude processing techniques, achieving the desired high probabilities of detection only occurs by setting the thresholds very low, which often results in an unacceptable number of false-alarm targets due to background clutter. Increasing the detection thresholds to produce a more acceptable number of false alarms unfortunately gives us an unacceptably low detection probability. Overcoming the above difficulties lead to the development of other radar signal processing techniques using different target attributes. These other techniques primarily related to the target's geometry that include polarization and other high resolution techniques.

Fractal geometry techniques use a numerical value of the fractal dimensions of radar signatures to distinguish man-made or artificial (also known as "regular") objects from "natural" objects that produce background clutter or noise. This invention uses the relationship between a newly developed mathematical transform, known as the Wavelet Transform, and fractal geometry to produce a robust, computationally efficient method to measure or estimate the fractal dimension of radar signatures, even in the presence of significant noise, reflected from the surface of a target. Current radar processors can incorporate this invention to increase the systems' ability to distinguish targets from background clutter.

The multiple-scale resolution capabilities of the Wavelet Transform make wavelet coefficients a natural set of coordinates in which to examine scale-invariant fractal signals such as radar returns from natural surfaces. The use of wavelet coefficients by this invention forms the basis of useful categorization algorithms leading to the capability of distinguishing manmade from natural reflectors by using the object's roughness. Combining wavelet coefficients with neural networks provide robust estimates of fractal dimension even in the presence of significant noise. Such a combination involves relative simplicity of implementation while affording great flexibility in accommodating a broad range of signal types and noise levels.

OBJECT AND SUMMARY OF THE INVENTION

An object of the present invention is to increase a radar system's capability of detecting a tactical target by a using a unique combination of wavelet coefficients and neural networks.

A feature of this invention is the use of wavelet coefficients and neural networks to estimate the fractal dimension of an artificial object's fractal surface.

An advantage of this invention is that radar systems can more successfully detect artificial objects or tactical targets even in the presence of significant background clutter.

Another advantage of this invention is that existing radar systems can increase the systems' detection capability by incorporating the present invention into the system.

A major problem of current radar systems is the inability of the system to detect objects or targets in the presence of background clutter and other background noise. One current work around technique to increase the recognition of targets is to decrease the threshold setting for detection. Unfortunately, decreasing the threshold setting produces an unacceptable number of false alarms. The present invention is a signal preprocessor that, when used in current radar systems, enhances the detectability of the radar signatures of tactical targets.

The present invention is a system that measures the fractal dimension of an object's fractal surface. The "smoother" the fractal dimension, the greater the probability that the object is an artificial or man-made object. Conversely, the "rougher" the object, the more likely the object is a natural object or natural phenomena that contributes to background clutter or background noise in radar signal processing.

The present invention is a preprocessor for image detection systems that operate in variety of signal spectra. For example, this invention is applicable to image detection systems that rely on electromagnetic signals such as video systems, radar systems, and even acoustical systems such as sonar. For active systems like radar, the system's transmitter aims it's antenna at an artificial object and transmits frequency stepped pulse signals consisting of a train of a number of pulses at the object. The surface of the object reflects the signals back to the system. The system receives the reflected return signals and combines the return signals with the transmitted signals to produce detected pulse return signals. For passive systems that rely on electromagnetic signals such as visual or light signals for example, the reflected signals consist of light reflected from the object to the receiver where the reflected signal combines with an internally generated frequency stepped pulse signals to produce the detected pulse return signals. Applying a Fourier Transform to the detected pulse signals produce a high resolution profile signal of the target. A Pyramid Transform decomposes the high resolution signal into Scales consisting of scaling basis coefficients and wavelet basis coefficients. During the decomposition of each Scale, the present invention calculates a Basis of scaling basis coefficients and wavelet basis coefficients using a Discrete Wavelet Transform. The invention can then estimate the fractal dimension of the object's fractal surface by using the calculated wavelet basis coefficients as the input into a neural network to produce the desired estimation. With the fractal dimension, a current radar system can then determine whether the object is an artificial one such as a target, or is nothing more than mere background clutter.

DESCRIPTION OF THE DRAWINGS

To further aid in understanding the invention, the attached drawings help illustrate specific features of the invention. The following is a brief description of the attached drawings.

FIG. 4(A-D) illustrates different Basis Functions with their associated Time-Frequency tradeoffs.

DETAILED DESCRIPTION OF THE INVENTION

Consideration of the following example, which is purely exemplary, further clarifies the use of the invention.

Figure 1:
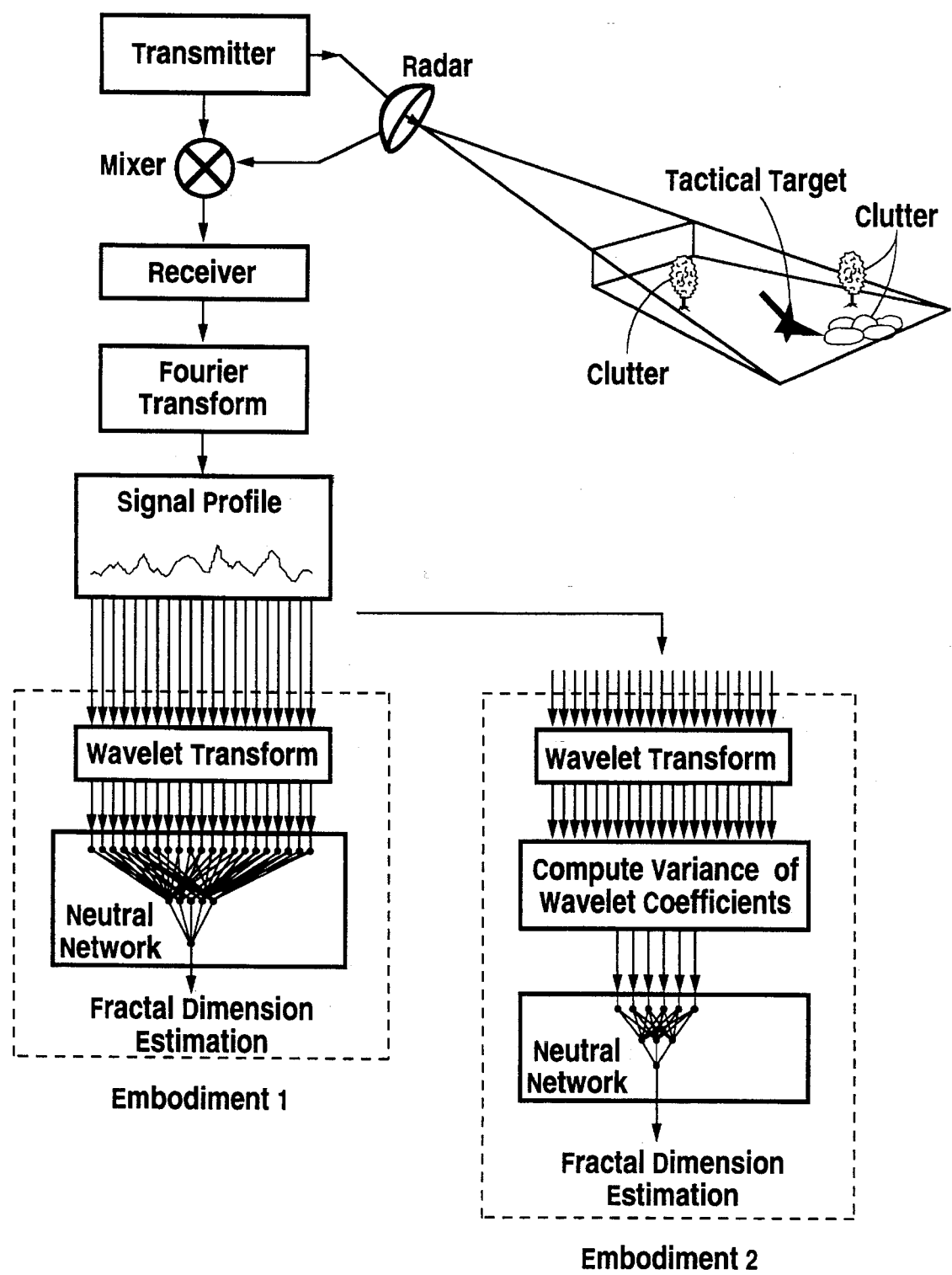
FIG. 1 summarizes the present invention and shows the different embodiments of the invention.

The present invention is a signal preprocessing system that existing radar processors can incorporate to distinguish targets more readily even in the presence of high background noise. FIG. 1 best illustrates the overall concept of the present invention. Since this invention is a single preprocessing system, this invention is also applicable to image detection systems that rely on electromagnetic signals such as video systems, radar systems, and even acoustical systems such as sonar. In other words, once one of the previous image detection systems acquires the necessary information, this invention can operate on the information in a manner as similar to the disclosed example of a radar system. For example, an active system requires that the active system transmit a signal at an object. The surface of the object will reflect the signal back to the system. For passive systems, the passive system receives the signals reflected from or generated by the object.

The beginning step in acquiring a radar signature for a target starts with the aiming of a high resolution radar system at a tactical target. The system continuously transmits frequency stepped pulse signals consisting of a train of a number of pulses at the target. The surface of the target reflects the signals back to the system. The high resolution radar system receives the reflected return signals and combines the return signals with the transmitted frequency stepped pulse signals to produce detected pulse return signals. The invention next applies a Fourier Transform to the detected pulse signals to produce high resolution profile signals of the target. At this point in other words, the radar system now has a radar signature of the target. Unfortunately, background clutter masks or hides the actual target. The present invention extracts the target information from the radar signature by effectively filtering out the background noise.

The next step in the present invention occurs when a Pyramid Transform decomposes the high resolution profile signals into Scales that consist of a number of scaling basis coefficients and wavelet basis coefficients. During the decomposition of each Scale, the present invention calculates a Basis of scaling basis coefficients and wavelet basis coefficients using a Discrete Wavelet Transform. The present invention can then estimate the fractal dimension of the target's fractal surface by using the calculated wavelet basis coefficients as the input into a neural network to produce the desired estimation. By knowing the Fractal Dimension of an object, a current radar system can then determine whether the object is an artificial one such as a target, or is nothing more than mere background clutter.

To better illustrate the present invention, we must first understand the concept of fractal geometry. We characterize fractal surfaces by their degree of self-symmetry, dilation symmetry, and scale invariance. The Fractal Dimension D measures the degree of "fractalness" of a particular surface. One commonly used example of naturally occurring fractal surfaces or curves is a coastline. When examining the coastline, we see a scalloped curve formed by innumerable bays and peninsulas. If we examine a more detailed map of the same region, we discover that we repeatedly see the same type of scalloped curves. As it turns out, this characteristic scalloping is present at almost all scales of examination; that is, the statistics of the curve are invariant with respect to transformations of scale.

Figure 2:
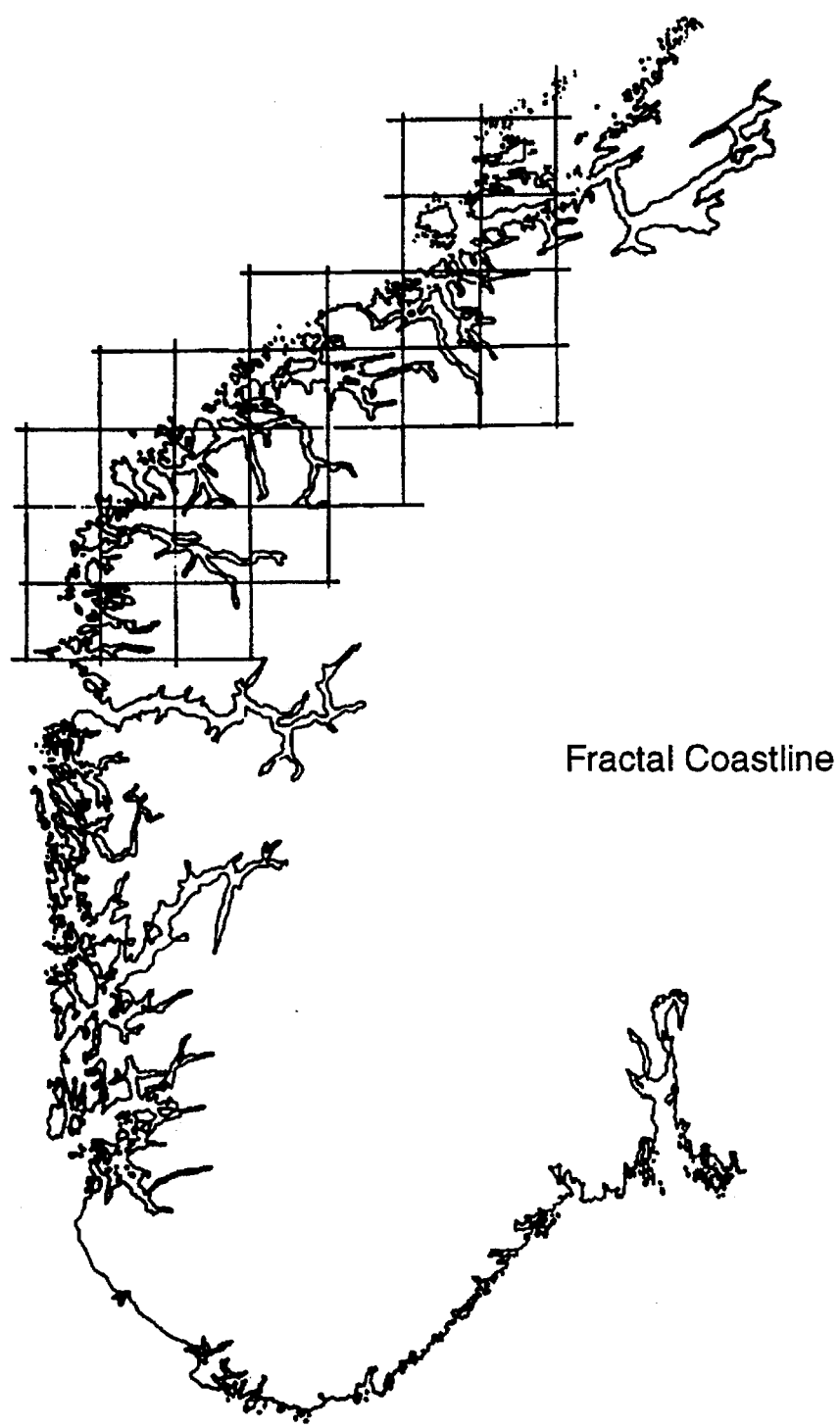
FIG. 2 depicts a coastline to aid in understanding fractal dimension.

Consider measuring, for example, the length of the fractal coastline of FIG. 2 to aid in understanding the concept of fractal dimension. We typically measure the length of a curve or area of a surface by taking a measurement instrument of size $\lambda$, and then calculate that n such instruments will cover the curve or surface. Our derived equation is where M is the metric property we want to measure such as length or area, and D is the topological dimension of the measuring instrument where D=1 for length, D=2 for area, and so on. The example coastline in FIG. 2 is a scalloped curve just like many other naturally occurring curves. If we measure the coastline in the traditional manner, however, we will miss all the curve's distinguishing features that are smaller than the size of the measuring tool. The measured length of the coastline depends not only on the coastline, but also on the length of the measurement tool itself! It follows, therefore, that the measured coastline length will increase when the measuring yardstick becomes shorter.

To obtain a consistent measurement of the coastline's length, we first need to generalize the concept of Fractal Dimension. Fractal surfaces will have Fractal Dimensions between 1 (for very smooth) and 2 (for very rough) to compensate for the length lost because of details smaller than $\lambda$. The unique fractional power, D, that yields a consistent estimate of the coastline's length is its Fractal Dimension. The alternate definition of D given in Eq. (1) characterizes the logarithmic rate of the increase in measured length to the decrease in yardstick size.

$$L(\lambda) = L_o \lambda^{1-D} \tag{1}$$

where $L(\lambda)$ is the coastline length measured with a yardstick of size $\lambda$ and $L_o$ is a constant. We can determine D by measuring the coastline using yardsticks with two different sizes $\lambda_1$ and $\lambda_2$.

$$D = \frac{\text{Log}\left(\frac{L_2}{L_1}\right)}{\text{Log}\left(\frac{\lambda_2}{\lambda_1}\right)} \tag{2}$$

where $L_1$ and $L_2$ are the measured coastlines with yardsticks $\lambda_1$ and $\lambda_2$. For smooth curves, the fractal dimension is 1. As the curve becomes more fractal in nature, the dimension becomes greater than one. The maximum value for the Fractal Dimension is 2.

The best way to describe the Wavelet Transform is to contrast it with the Fourier Transform, a mathematical relationship familiar to most engineers and scientists. The starting point for describing the Wavelet Transform is the Uncertainty Principle, which describes the relationship between a signal's time duration, $\Delta t$, and its bandwidth, $\Delta \omega$, and given by the standard deviations of the signal, $f(t)$, and its Fourier Transform, $F(\omega)$, where:

$$(\Delta t)^2 = \int (t-\bar{t})^2 |f(t)|^2 dt \text{ where } \Delta t = \text{Duration} \tag{3a}$$

and $$(\Delta \omega)^2 = \int (\omega - \bar{\omega})^2 |F(\omega)|^2 d\omega \text{ where } \Delta \omega = \text{Bandwidth} \tag{3b}$$

The Uncertainty Principle states that a signal's duration and bandwidth must satisfy the following relationship:

$$\Delta t \cdot \Delta \omega \geq \pi \tag{4}$$

This principle tells us that a short signal yields a wide spectrum. That is, both the signal's duration and the signal's bandwidth cannot simultaneously both be arbitrarily small.

The Uncertainty Principle's importance in transform theory comes from the fact that a transform represents a signal in terms of (usually orthogonal) basis elements. Each of the basis elements used to represent a function covers a localized area in time and frequency.

For example, the Discrete Fourier Transform of an N point discrete signal (with sampling period T) uses N exponential basis functions each of which have time duration $NT = \Delta t$ equal to the length of the discrete signal. The frequency duration of each basis function is equal to $(1/N)$th, of the Nyquist frequency $$\Delta \omega = \frac{2\pi}{2NT} \text{ so } \Delta t \cdot \Delta \omega = \pi.$$

Figure 3:
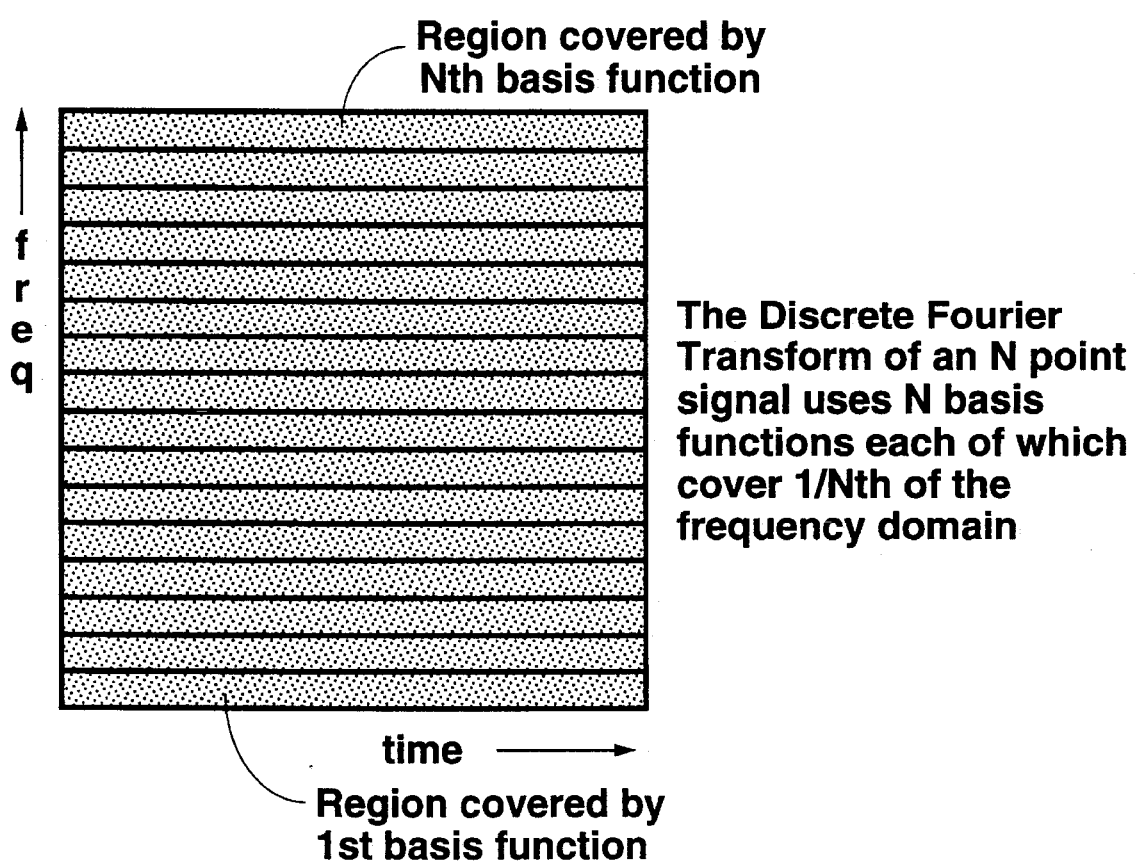
FIG. 3 illustrates a sample Discrete Fourier Transform of an N point signal.

We plot the time and frequency duration of each of the N basis functions on a "time-frequency plane." FIG. 3 illustrates this principle for a 16 point signal. Each of the basis functions covers the entire time duration and $1/16$th of the frequency duration. Other transforms use basis functions with different time-frequency tradeoffs. FIG. 4 illustrates some of the potential tradeoffs with various time-frequency domains. In each case, the region covered by a basis function cannot be arbitrarily small because the basis function must satisfy the condition of Eq.(4). If the region covered by a basis function is narrow in frequency, the covered region must cover a large area in time and vice versa. FIG. 4a shows basis functions that have broad frequency coverage but are narrow in time. FIG. 4b and FIG. 4c show basis functions that have intermediate time-frequency tradeoffs, and FIG. 4d shows basis functions that are narrow in frequency but have broad time coverage. Since it is impossible to use basis functions with arbitrarily high resolution in both time and frequency, the result is inefficient representations of signals.

Ideally, we would like to represent a signal as compactly as possible on the time-frequency plane because we can then easily identify and manipulate the signal's characteristics. Any mathematical transform can produce a poor representation for signals that have characteristics that do not match the signal's basis functions very well. For example, while the Discrete Fourier Transform produces very concentrated representations for sinusoidal signals, sharp signal discontinuities become spread across many basis coefficients.

The search for a better method to represent signals with discontinuities led to the development of the Wavelet Transform. The Wavelet Transform uses variable width basis functions that trade resolution in time for resolution in frequency. To isolate discontinuities isolated in time but spread over a broad frequency range, the Wavelet Transform uses very short basis functions in the high frequency regions of the time-frequency plane. At low frequencies, the Wavelet Transform uses long basis functions that give good frequency resolution. With its short basis functions, the Wavelet Transform is able to isolate signal discontinuities.

Figure 5:
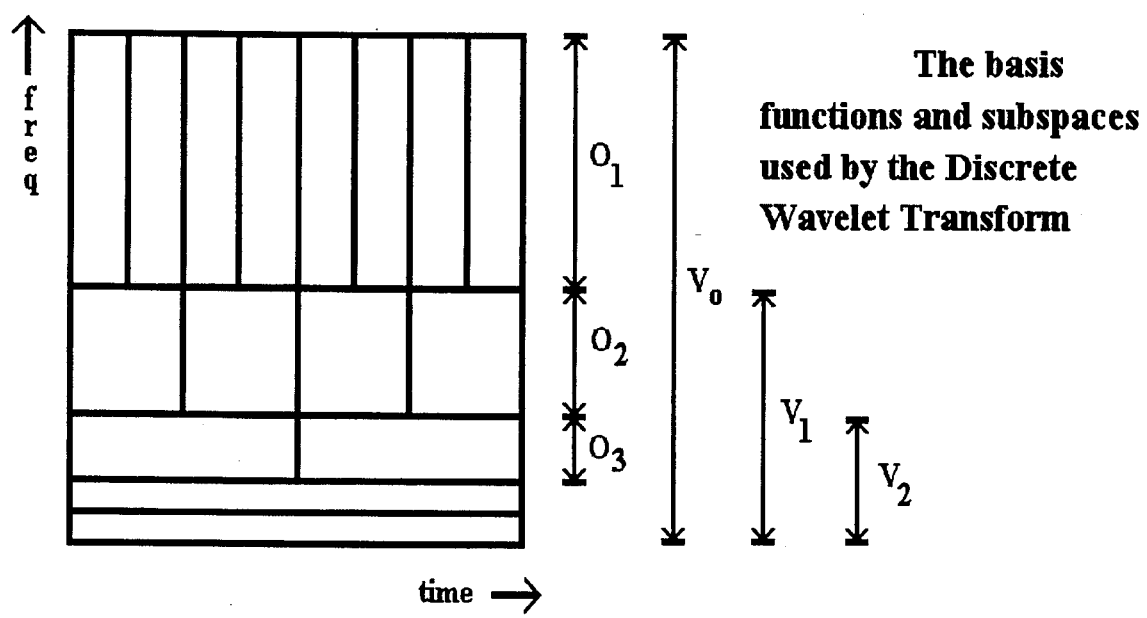
FIG. 5 illustrates the basis functions and subspaces used by the Discrete Wavelet Transform.

Most signal processing, compression, and numerical analysis applications involve discrete sampled signals consisting of a sequence of numbers $\{c^o(n): n=0, \ldots, N-1\}$. The Discrete Standard Wavelet Transform decomposes such signals into coefficients corresponding to basis functions with time-frequency characteristics. The basis functions used in the upper half of the frequency plane, mathematical subspace $O_1$, are narrow in time and broad in frequency. For lower frequencies, the Discrete Wavelet Transform uses basis functions that are longer in time and more narrow in frequency. FIG. 5 illustrates that the regions covered by the basis functions are distinct and non-overlapping.

The theory behind the Discrete Wavelet Transform comes from the idea of a multiresolution approximation to a signal that is the set of projections of a signal $f(t)$ onto the mathematical subspaces, the time-frequency regions, of $\{V_j: j=0,1,2, \ldots\}$ depicted in FIG. 5. $V_0$ is the space containing the original signal, $V_1$ is the lower half of the frequency space, $V_2$ is the lower one-quarter of the frequency space, and so on. As we only consider the part of the signal contained in $V_1, V_2, \ldots$, we see that the signal becomes a more smoothed version of the original signal while containing less and less information. Our goal is to develop a mathematical basis for each of the subspaces $\{V_j: j=0,1,2,\ldots\}$ where each Basis is a set of functions that when multiplied by appropriate coefficients, and added together, sum to the signal's component in the subspace of interest. To produce a Basis, mathematicians have shown that special functions exist called scaling functions. A scaling function, $\Phi(t)$, exists in $V_0$ and has the property that if we set $$\Phi_j(t) = 2^{\frac{-j}{2}} \Phi(2^{-j} t) \text{ for } j = 1, 2 \tag{5a}$$

and $$\Phi_{jk}(t) = \sqrt{2^{-j}} \Phi(t - 2^{-j} k) \tag{5b}$$

then the set of $\{\Phi_{jk}(t)\}$ when summed over k form a Basis for subspace $V_j$.

Note that $\Phi_{jk}(t)$ is a dilated version of $\Phi(t)$. The parameter j performs dilation and the parameter k performs translation.

To produce a multiresolution approximation for a discrete signal, we construct the function f(t) where:

$$f(t) = \sum_{n=0}^{N-1} c^o(n)\Phi_{on} = \sum_{n=0}^{N-1} c^o(n)\Phi(t-n) \quad (6)$$

Note that are scaling basis coefficients for the function f(t) in $V_0$. Our goal now is to find a set of scaling basis coefficients $\{c^1(k)\}$ representing the signal in subspace $V_1$. We note that we can represent these scaling basis coefficients as:

$$c^1(k)<\Phi_{1k},f_{V1}> = <\Phi_{1k},f> = \sum_n c^o(n)<\Phi_{1k},\Phi_{0n}> \quad (7)$$

where (·) denotes inner product and $f_{vl}$ denotes the component of f in $V_1$. When we expand the inner product in Eq. (7) and generalize the equation to scales j and j+1, our equation for the scaling basis coefficients becomes the filter equation:

$$c^{j+1}(k) = \sum_n h(n-2k)c^j(n) = \sum_n h(n)c^j(2k-n) \quad (8a)$$

where:

$$h(n) = 2^{-1/2} \int dx \Phi\left(\frac{1}{2}x\right) \Phi(x-n) \quad (8b)$$

Eq. (8a) shows us that we can compute the scaling basis coefficients representing the signal in $V_{j+1}$ by convolving $\{c^j(n)\}$ with a filter h and keeping every other sample of the output. We can compute all the scaling basis coefficients for $V_2, V_3, \ldots$ by repeating this process. We call this process a Pyramid Transform.

The scaling function completely characterizes the multi-resolution approximation. Derived conditions for the scaling function are possible that give the function good time and frequency localization. Localization is important because then each scaling basis coefficient gives information about the signal in a localized region of the time-frequency plane. Good time and frequency localization results when the filter h and its Fourier Transform, $F_h(\omega)$, meet the following conditions:

$$|F_h(0)|=1 \text{ and } h(n)=O(n^{-2}) \text{ at infinity} \quad (9a)$$

$$|F_h(\omega)|^2+|F_h(\omega+\pi)|^2=|F_h(\omega)|^2+|F_g(\omega)|^2=1 \quad (9b)$$

where g is the conjugate filter of h.

The Wavelet function, $\Psi(t)$, relates to the scaling function through the following Fourier Transform relationship:

$$F_\Psi(\omega) = F_g\left(\frac{\omega}{2}\right) F_\Phi\left(\frac{\omega}{2}\right) \quad (10)$$

where: $F_g(\omega) = e^{-i\omega} F_h(\omega + \pi)^*$
and $g(n) = (-1)^n h(1-n)$
such that if $$\Psi_{jk}(t) = \sqrt{2^{-j}} \; \Psi(t-2^{-j}k) \quad (11)$$

then the set of these, summed over k, form an orthonormal basis of subspace $O_j$. In a manner similar to Eq. (8a), we can compute the wavelet basis coefficients representing the signal in $O_{j+1}$ by the filter equation:

$$d^{j+1}(k) = \sum_n g(n-2k)c^j(n) = \sum_n g(n)c^j(2k-n) \quad (12a)$$

where:

$$g(n) = 2^{-1/2} \int dx \Psi\left(\frac{1}{2}x\right) \Psi(x-n) \quad (12b)$$

Figure 6:
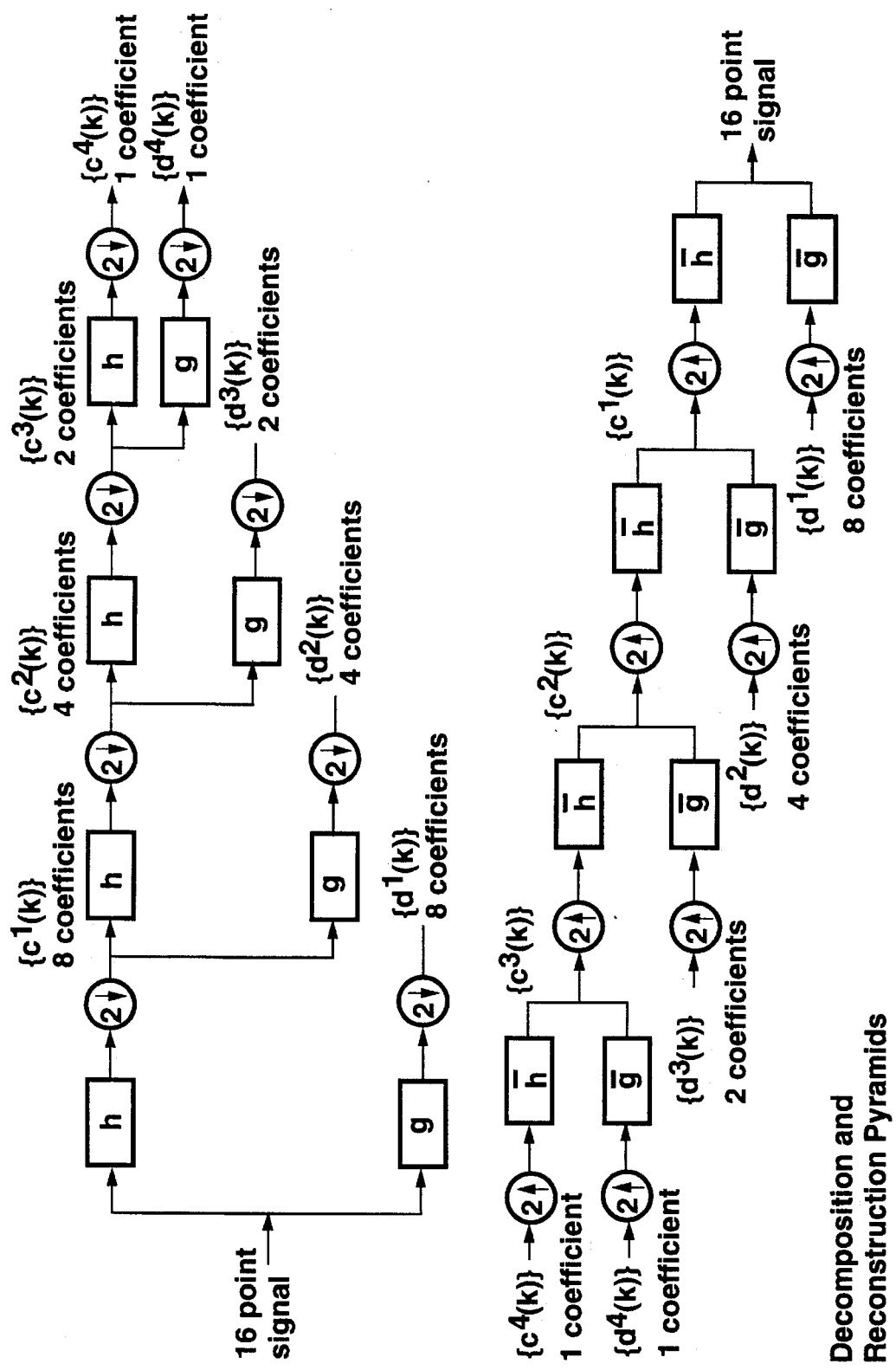
FIG. 6 illustrates the Decomposition and Reconstruction Pyramids using the Discrete Wavelet Transform for a 16 point signal.

The set of $\{d^j(k)\}$ for all the subspaces $\{O_j; j=1,2,3 \ldots\}$ are the wavelet basis coefficients. Eq. (8a) and (12a) show that we can compute basis coefficients through an extremely simple filtering operation once we know the filter's h and g. Additionally, in the special case when the number of points is an even power of 2, the wavelet basis coefficients become $\{d^j(k): j=1, \ldots, M \log_2 N \text{ and } k=0, \ldots, \log_2(M-j)\}$. FIG. 6 illustrates the decomposition of a signal using a Pyramid Transform to compute the coefficients for a 16 point signal using equations Eqs. (8a) and (12a).

Since Wavelet representation is complete, we can reconstruct the original signal from its Wavelet representation by using a derivation similar to that of Eqs. (8a) and (12a), where we can show:

$$c^{j-1}(n) = 2\sum_k h(k)c^j(k-2n) + 2\sum_k g(n)d^j(k-2n) \quad (13)$$

We can then completely reconstruct the signal $\{c^o(n)\}$ by using a Pyramid Transform that successively applies Eq. (13) to the wavelet coefficients. FIG. 6 shows the reconstruction pyramid for a 16 point signal.

To use the Wavelet Transform, we must first recognize the meaning of the $\{c^j(k)\}$ and $\{d^j(k)\}$ basis coefficients. The $\{c^j(k)\}$ scaling basis coefficients correspond to scaling basis functions $\{\Phi_{jk}\}$ that represent the function in subspaces $V_j$. The basis coefficients, $\{d^j(k)\}$, correspond to wavelet basis functions $\{\Psi_{jk}\}$ that represent the function in subspaces $O_j$. These wavelet basis coefficients produce concentrated representations for signal discontinuities. For example, the wavelet basis coefficients $\{d^1(k)\}$ represent the signal in the subspace $O_1$. These coefficients correspond to wavelet basis functions that are broad in frequency, short in time, and are, therefore, well matched to signal discontinuities. If there are N points in the original sequence, $\{c^o(n)\}$ there are N/2 members of $\{d^1(k)\}$. The wavelet basis coefficients $\{d^2(k)\}$ represent the signal in $O_2$. The corresponding wavelet basis functions are less broad in frequency and are therefore longer in time than the first set. There are N/4 of these coefficients. The decomposition continues for resolutions or Scales. For Scale M, there is only one wavelet basis coefficient corresponding to a basis function that is very narrow in frequency and therefore long in time. Additionally at Scale M, we include the scaling basis coefficient $\{c^M(0)\}$ in the Discrete Wavelet Transform to represent the "DC" component of the signal.

Fractional Brownian motion (fBm) offers a convenient model for fractal signals, and by establishing the mathematical relationships between fractional Brownian motion and their Wavelet Transforms, we can implement in the present invention a robust and computationally efficient method to estimate the Fractal Dimensions of fractal signals even in the presence of noise. Conceptually fBm is a generalization of Brownian motion. Brownian motion, meanwhile, is a "random walk" where the particle position has the following properties:

$$E\{X(t)-X(t_o)\}=0 \quad (14a)$$

$$var(t-t_o)=E\{(X(t)-X(t_o))^2\}=2C(|t-t_o|) \quad (14b)$$

Eq. (14a) tells us that the increment of the Brownian process has zero mean, and Eq. (14b) tells us that the variance diverges with time. Fractional Brownian motion, $B_H(t)$, is a natural extension of ordinary Brownian motion, and gives us a Gaussian, zero-mean, non-stationary process indexed by a single scalar parameter H, where 0<H<1, while ordinary Brownian motion is given by H=½. Fractional Brownian motion also has the following properties:

$$E\{B_H(t) - B_H(t_o)\} = 0 \quad (15a)$$

$$var(t - t_o) = \quad (15b)$$

$$E\{(B_H(t) - B_H(t_o))^2\} = 2C_\tau \left(\frac{|t - t_o|}{t}\right)^{2H} \approx |t - t_o|^{2H}$$

Fractional Brownian motion has infinitely long-run correlations, that is, past increments correlate with future increments. The correlation function, C(t), of the increment from $-t$ to 0 with the increment from 0 to t is given by $$C(t) = \frac{E\{-B_H(-t)B_H(t)\}}{E\{B_H(t)^2\}} = 2^{2H-1} - 1 \quad (16)$$

For H=½, the correlation of past and future increments C(t) vanishes for all t as required for an independent random process. Therefore, H=½ is the special case of ordinary Brownian motion. For H≠½, C(t)<0 that leads to persistence or antipersistence. For H>½, there is persistence. If in some time in the past there was a positive increment, then in the future on the average there will be an increase. Therefore, an increasing trend in the past implies an increasing trend in the future. Conversely a decreasing trend in the past implies on the average a continued decrease in the future. Antipersistence occurs for H<½. In this case, an increasing trend in the past implies a decreasing trend in the future and vice versa.

Since fBm is not a stationary process, we cannot directly associate a spectrum with the process by using the standard power spectral density. However, if we analyze fBm by using the Wigner-Ville Transform, a time-frequency transform that generalizes the concept of power spectral density for nonstationary signals, we find that the spectrum is proportional to:

$$\frac{1}{|\omega|^{2H+1}} \quad (17)$$

The above relationship establishes that fBm is a 1/f-type process because of the nature of decay of its spectrum.

Fractional Brownian motion also exhibits a self similarity. We mean by this that for any a>0, with the convention $B_H(0)=0$, that the statistics of the process $B_H(at)$ are the same as the statistics of the process $a^H B_H(t)$. This self similarity, which is inherent to the fBm structure, has the consequence that one individual realization of such a process is a fractal curve. Additionally, the Fractal Dimension, D, relates to the parameter H by D=2-H.

Due to the self similarity properties of wavelets and fractal signals, we can conclude that wavelets are a robust, nearly optimal representation of 1/f processes and therefore of fractal signals. We can show that the Wavelet Transform of fBm has the following properties:

1. The wavelet coefficients at any one Scale are self-similar and stationary. That is, for any Scale j, $E\{d_j[n]d_j[m]\}$ is a unique
   function of n-m.
2. The wavelet basis coefficients across Scales are stationary in the sense that for synchronous time instants at two Scales, j and k, given by n at Scale j and at Scale k, $E\{d_j[n]d_j[m]\}$ is a unique function of j-k.
3. The scaling basis coefficients, $\{c_j(k)\}$, at any one Scale are self-similar but are not stationary. This is because the essential cause of nonstationarity in fBm centers on the zero frequency. Thus, the details in the fBm, extracted by wavelet coefficients, are stationary while the approximations are not.
4. The variance of wavelet basis coefficients across Scales follows the power law behavior:

$$\log_2(var\{d_j[n]\})(2H+1) \cdot j = \text{cons tan } t \quad (18)$$

This last result gives us a method to determine the Fractal Dimension of a fractal in the presence of no noise:

1. We first compute the Wavelet Transform of an N-point discrete fractal signal. Our result is N/2 wavelet basis coefficients at Scale 1 with $\{d_k^1 : k=0, \ldots, (N/2)-1\}$, N/4 wavelet basis coefficients at Scale 2 with $\{d_k^2 : k=0, \ldots, (N/2)-1\}$, and so on down to the last Scale (M=$\log_2$ N) where there is a single wavelet basis coefficient and a single scaling basis coefficient representing the DC component.
2. We compute the variances of the wavelet basis coefficients, $VarS_j$, at each Scale, j, by:

$$VarS_j = \frac{1}{2^{M-j}} \sum_{k=0}^{2^{M-j}} (d_k^j - m_j)^2 \quad (19)$$

where is the mean of the wavelet basis coefficients at Scale j.

3. We plot the log of the variance versus the Scale number j and determine the slope of the plot. The slope is approximately equal to 5−2D, where D is the Fractal Dimension of the original data.

Figure 7:
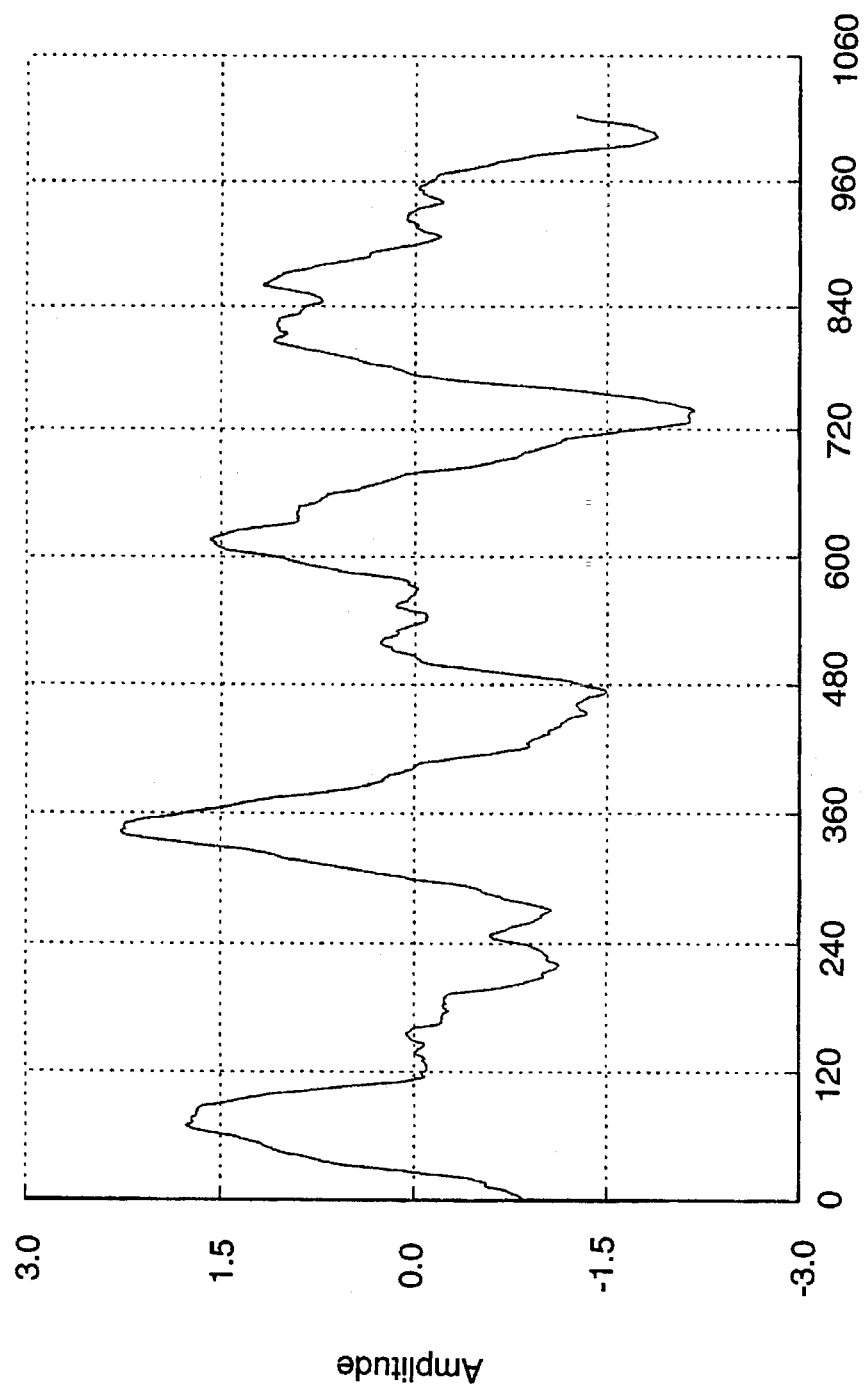
FIG. 7 is a sample fractal signal with a Fractal Dimension of D=1.5.
Figure 8:
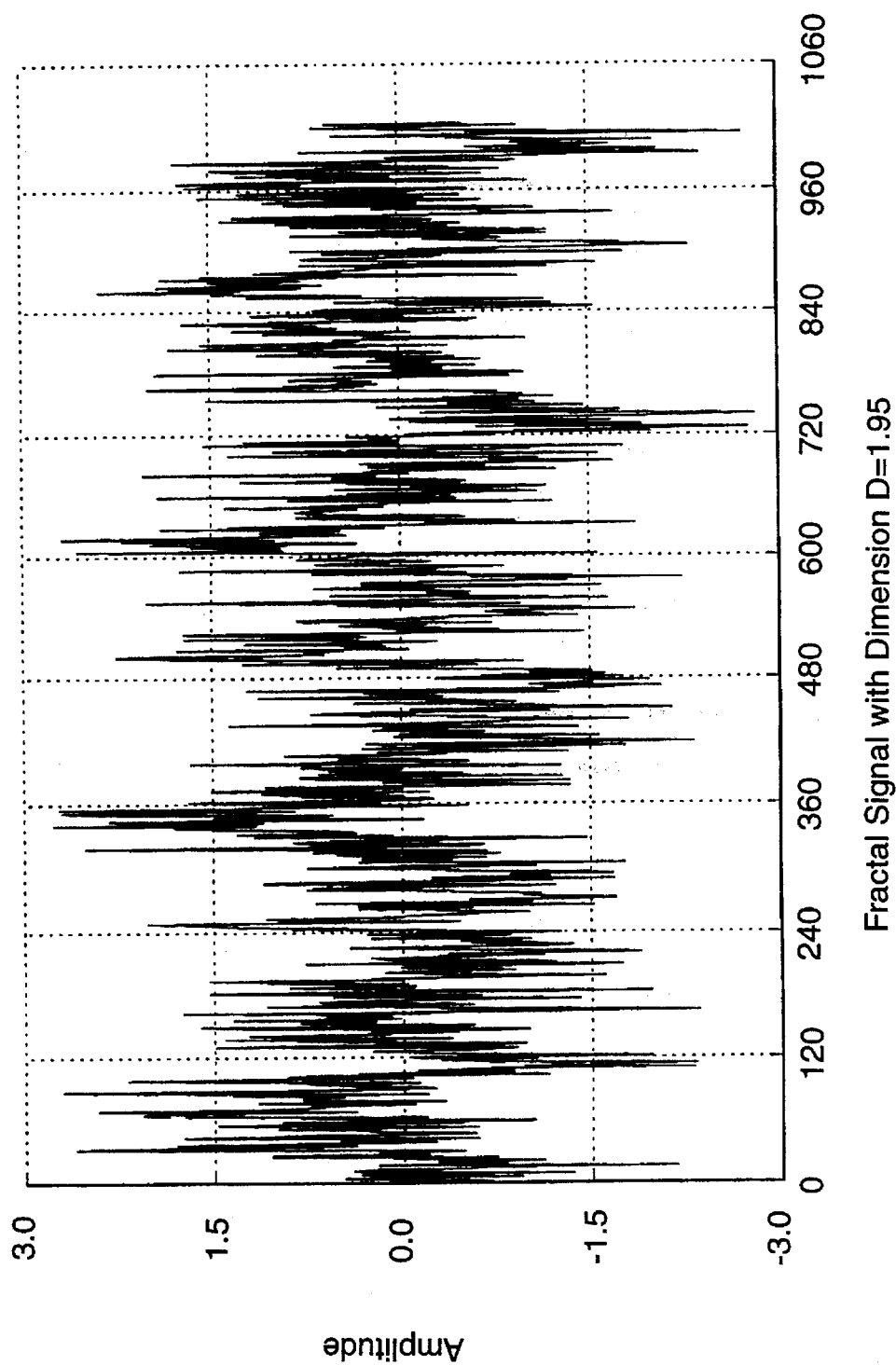
FIG. 8 is a sample fractal signal with a Fractal Dimension of D=1.95.
Figure 9:
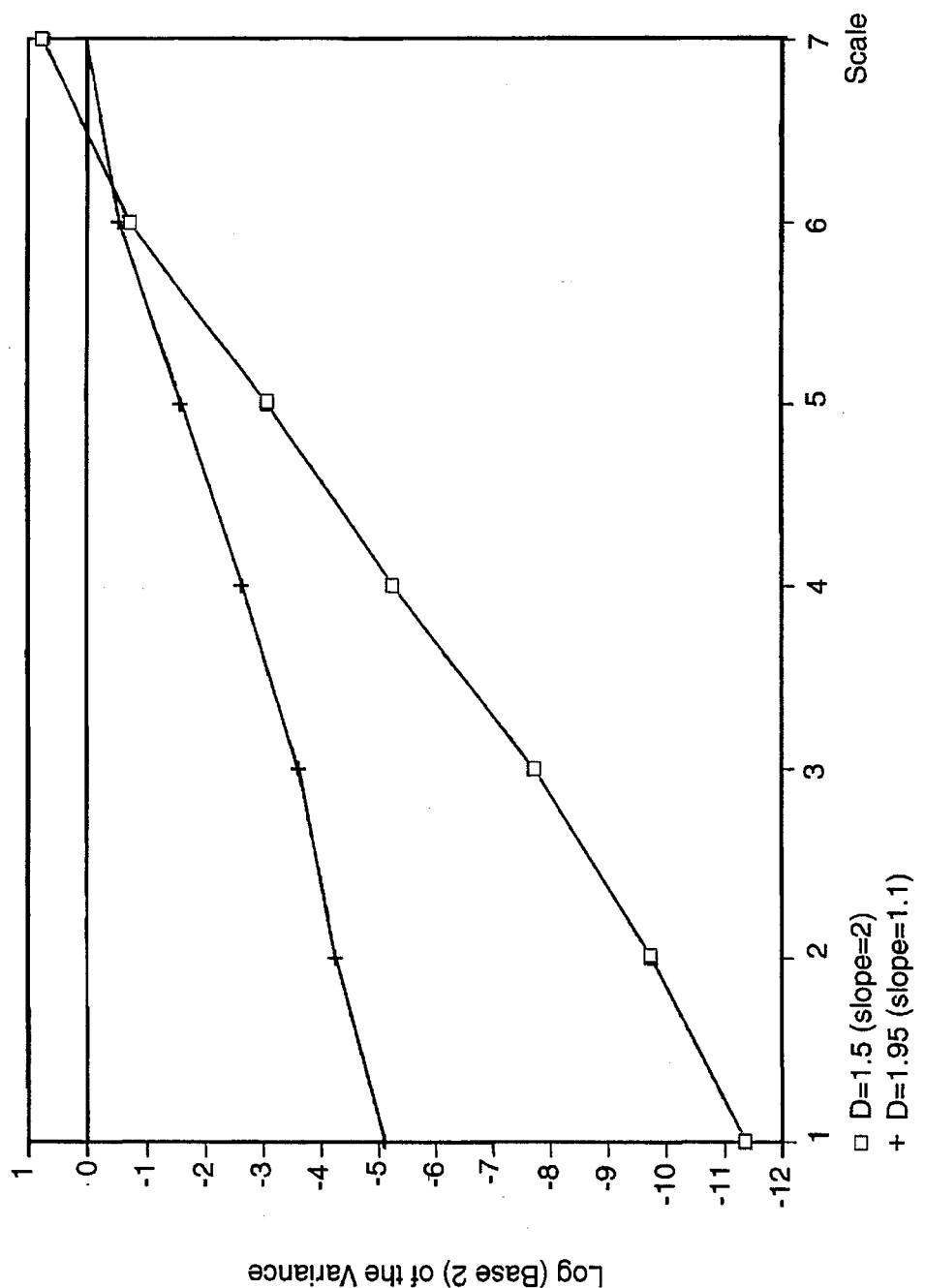
FIG. 9 is a plot of the Variance of the wavelet basis coefficients for each Scale.

FIG. 9 demonstrates the results of such an estimation procedure. The first plot in FIG. 9 is the log of the variance of the wavelet basis coefficients at each Scale versus the Scale for the fractal signal in FIG. 7. FIG. 7 is a sample fractal signal with a Fractal Dimension of D=1.5. The second plot in FIG. 9 shows the log of the variance of the wavelet basis coefficients at each Scale versus the Scale for the fractal signal in FIG. 8. FIG. 8 is a sample fractal signal with a Fractal Dimension D=1.95. Both of the fractal signals in FIG. 7 and FIG. 8 represent a hypothetical radar signature or high resolution radar signal that we might expect to see in real life. The slopes of the two curves in FIG. 9 accurately predicted the equation with slope=5−2D that comes from the mathematical relationship between fractals and wavelets. A best line fit for D=1.5 gives a slope of 2.003 versus the predicted 2, and a best line fit for D=1.95 gives a slope of 0.95 versus the predicted 1.1. This establishes a method we can easily estimate the Fractal Dimension by using the Wavelet Transform in the absence of noise.

Figure 10:
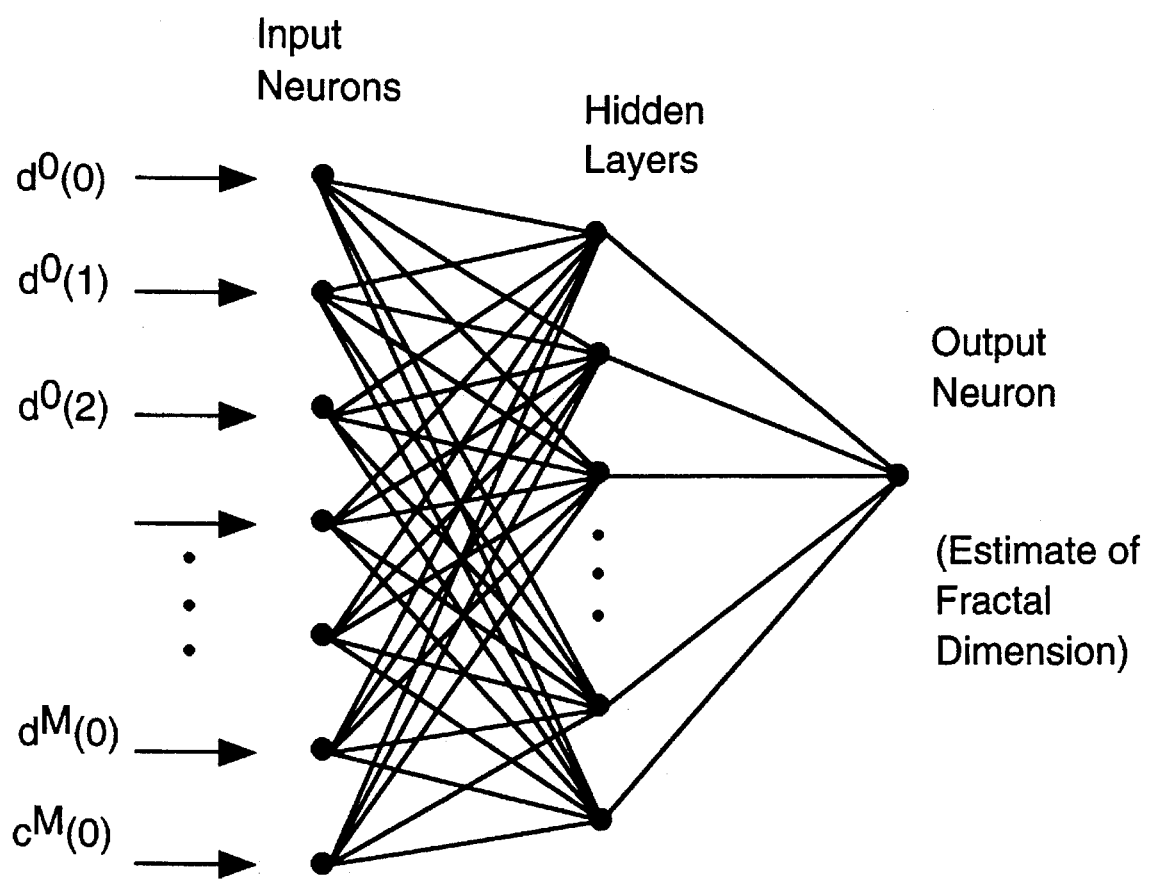
FIG. 10 illustrates a neural network with one input neuron for each wavelet basis coefficient.
Figure 11:
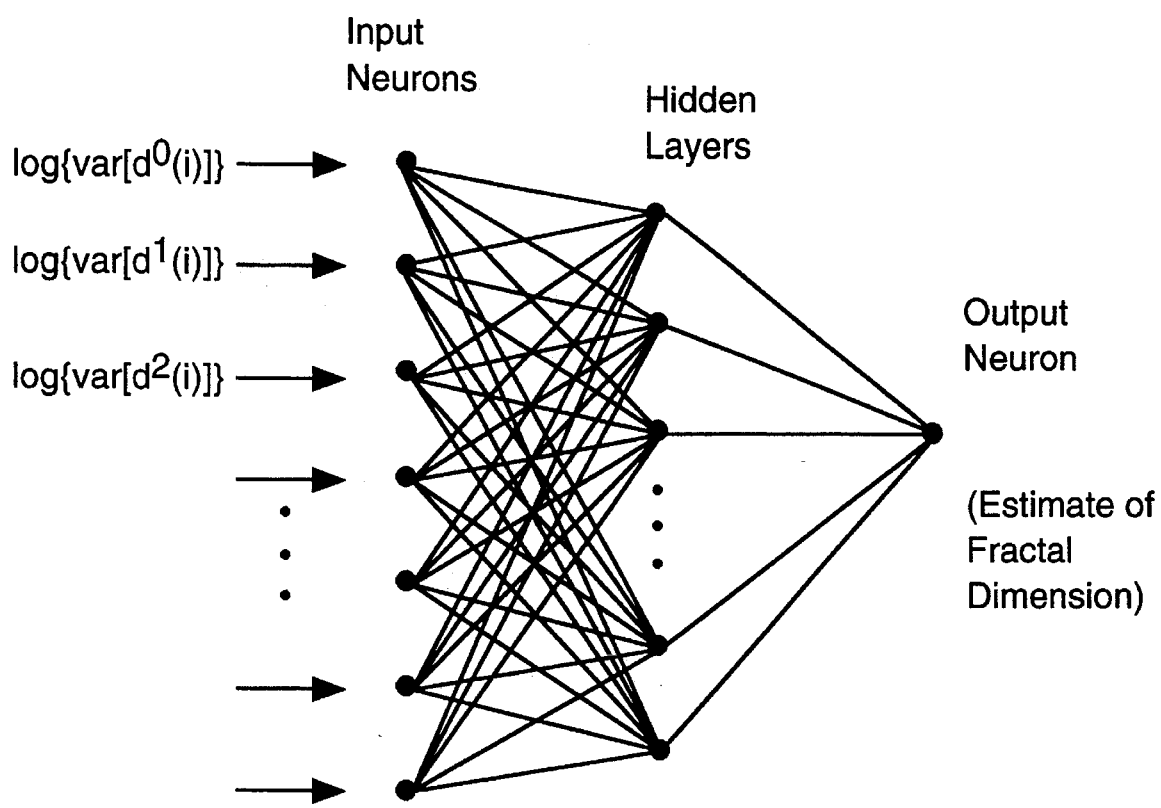
FIG. 11 illustrates a neural network having one input neuron for the Log variance of the wavelet basis coefficients at each Scale.
Figure 12:
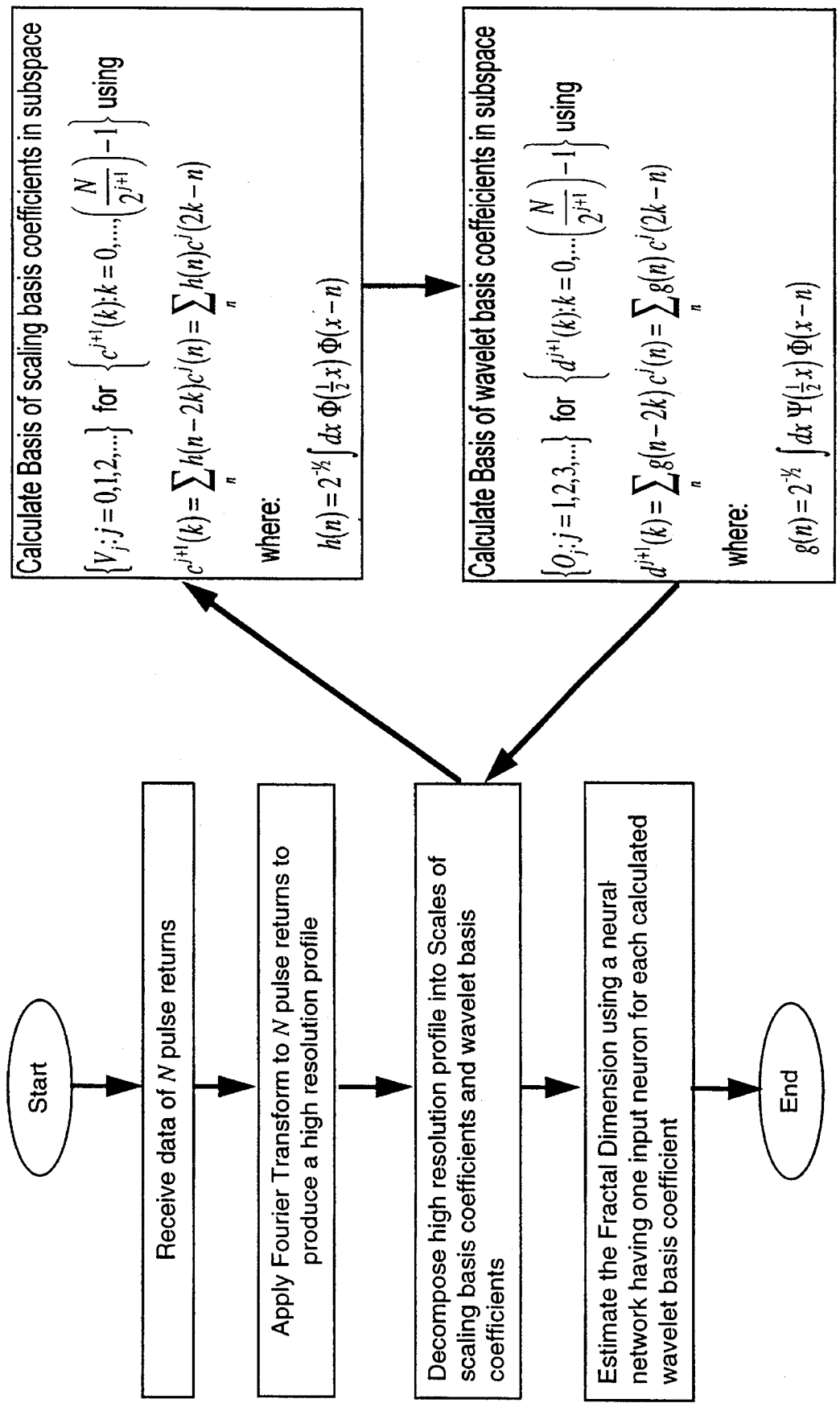
FIG. 12 is flowchart of the first embodiment of the invention.
Figure 13:
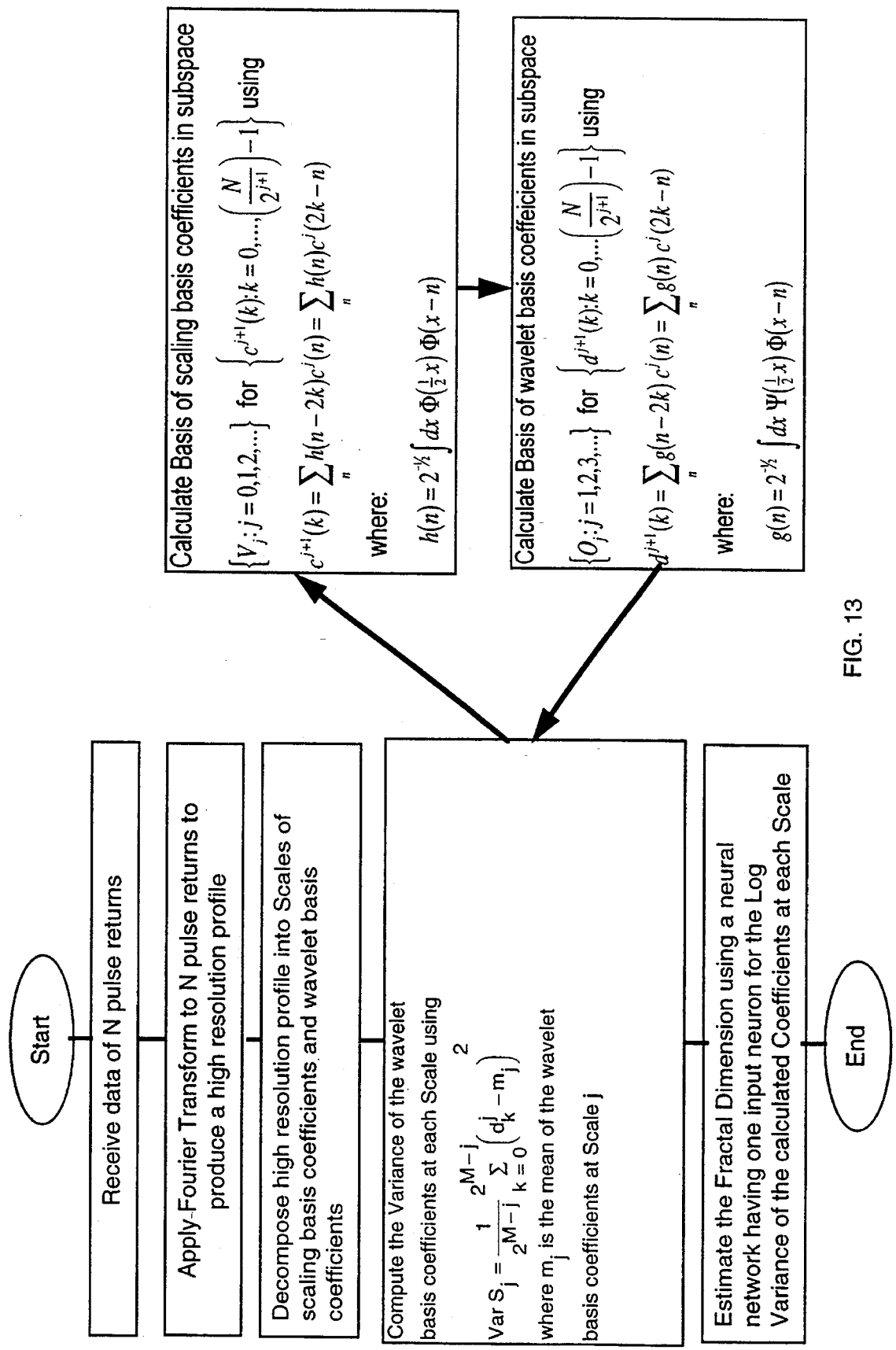
FIG. 13 is a flowchart of the second embodiment of the invention.

This invention uses a supervised learning backpropagation neural network to estimate the Fractal Dimension of noisy fractal signals. I discovered that this unique combination of a Wavelet preprocessor with a neural network estimator provides a much more robust and computationally efficient method of measuring Fractal Dimension than previously used Maximum Likelihood (ML) estimators. The previously used ML estimators do not adequately filter out background clutter. To best illustrate this unique combination, I used a layered neural network trained through supervised backpropagation. I tested the network using fractal signals of lengths 64 and 128 chosen to simulate returns of objects in a manner similar to high resolution radar (HRR) returns of objects. The invention employs alternate approaches to estimate the fractal dimension using backpropagation neural networks. In the first approach shown in FIG. 10, the neural network contains an input neuron for each wavelet basis coefficient of the signal. In other words, the number of wavelet basis coefficients is the same as the number of points in the signal The neural network trains the output neuron to the value of the fractal dimension. In the second approach shown in FIG. 11, I compute the variance of each Scale's wavelet basis coefficients, with the variances form each Scale input to the neural network. Again, the neural network trains the output neuron to the value of the fractal dimension.

The geometry of the neural network differs for the two different approaches. In the first embodiment, there are either 64 or 128 input neurons depending on the signal length. In the second embodiment there are 5 or 6 input neurons. In each embodiment, there is a single output neuron producing the estimated Fractal Dimension. There is considerable flexibility in choosing the number of layers and the number of neurons between the input and output. However, the network loses the ability to generalize if there too many neurons, and may not be able to learn if there are too few neurons.

To train the network, I needed to provide a set of training examples. The training examples consist of sample signals along with identifications of the Fractal Dimension characterizing the signals. By varying the weight coefficients connecting the neurons, the neural network configures itself to optimize its performance in identifying the Fractal Dimensions of the training signals.

Once the network performs acceptably on the training data, we again test the network on an independent data set, that again consist of signals along with identifications of their respective Fractal Dimensions. Such testing is important to insure that the network has not "over-trained" by fitting noise characteristics as well as those of the underlying signal. If performance on the testing set is poor, we reduce the number of internal neurons in the network and retrain the network until we achieve satisfactory performance. At the successful completion of the training step, the network is ready to estimate unknown fractal dimensions.

Wornell previously developed a method to estimate the Fractal Dimension in the presence of additive, stationary white Gaussian noise. Wornell, G. W., and Oppenheim, A., *Estimation of Fractal Signals from Noisy Measurements Using Wavelets*, IEEE TRANSACTIONS OF SIGNAL PROCESSING, Vol. 40, No. 3 (March 1992). His algorithm depends on the fact that the Wavelet Transform is a whitening filter for fractal (1/f) processes. That is, the wavelet coefficients of a fBm process are stationary and zero mean. Wornell's approach uses standard maximum likelihood (ML) methods to estimate the variance of the signal, noise, and the value of H. Wornell's estimate-maximize (E-M) algorithm performs much more poorly in the presence of noise than does the neural network estimation procedure of the present invention.

Tables 1 and 2 summarize the results of testing the M-L, estimator against the present invention's neural network estimators. Table 1 gives results for fractal signals generated through the summed-sinusoid method of Sun, and Table 2 gives results for signals generated using the recursive method of Corsini and Saletti. Sun, X., *Electromagnetic Wave Scattering form Fractal Structures*, UNIVERSITY OF PENNSYLVANIA (1989) (Ph.D. Dissertation), and Corsini, G., and Saletti, R., *A 1/f Power Spectrum Noise Sequence Generator*, IEEE TRANSACTIONS INSTRUM. MEAS., Vol. 37, pp. 615–619 (December 1988) In Table 1, we evaluate signals of Fractal Dimension 1 (smooth man-made) and 2 (rough "natural" surfaces) for pulses of 64 and 128 points at signal-to-noise ratios of 2, 5, 10, and 20. We compare the three estimation methods for efficiency: the E-M maximum-likelihood estimator (M-L), the neural network, operating on the complete wavelet representation of the pulse (Neural Net (1)), and the neural network operating on the Scale variances of the signal, calculated from the wavelet basis coefficients (Neural Net (2)). Each line in the table represents a test using 200 signals. The first column gives the signal-to-noise ratio for the test, the second column gives the number of points in the signal and the third column gives the actual fractal dimension of the signals. The two columns for each technique represent the means and sample standard deviations of the estimated Fractal Dimensions.

TABLE 1

| Signal Characteristics | | | M-L | | Embodiment (1) | | Embodiment (2) | |
| --- | --- | --- | --- | --- | --- | --- | --- | --- |
| SNR | N | D | $\hat{D}$ | $\sigma_D$ | $\hat{D}$ | $\sigma_D$ | $\hat{D}$ | $\sigma_D$ |
| 20 | 128 | 1 | 3.71 | .10 | 1.09 | .09 | 1.06 | .01 |
| 20 | 128 | 2 | 2.68 | .06 | 1.81 | .30 | 1.97 | .03 |
| 10 | 128 | 1 | 3.53 | .14 | 1.11 | .09 | 1.07 | .03 |
| 10 | 128 | 2 | 2.68 | .07 | 1.85 | .21 | 1.97 | .04 |
| 5 | 128 | 1 | 3.28 | .16 | 1.16 | .25 | 1.07 | .05 |
| 5 | 128 | 2 | 2.66 | .07 | 1.57 | .40 | 1.98 | .05 |
| 2 | 128 | 1 | 2.90 | .13 | 1.28 | .31 | 1.10 | .14 |
| 2 | 128 | 2 | 2.63 | .07 | 1.75 | .32 | 1.95 | .12 |
| 20 | 64 | 1 | 3.83 | .13 | 1.11 | .20 | 1.04 | .02 |
| 20 | 64 | 2 | 2.75 | .06 | 1.79 | .34 | 1.97 | .03 |
| 10 | 64 | 1 | 3.67 | .16 | 1.17 | .26 | 1.03 | .02 |
| 10 | 64 | 2 | 2.75 | .08 | 1.61 | .39 | 1.97 | .04 |
| 5 | 64 | 1 | 3.40 | .22 | 1.15 | .22 | 1.05 | .07 |
| 5 | 64 | 2 | 2.72 | .09 | 1.72 | .35 | 1.95 | .11 |
| 2 | 64 | 1 | 2.97 | .18 | 1.36 | .41 | 1.10 | .14 |
| 2 | 64 | 2 | 2.68 | .10 | 1.58 | .44 | 1.95 | .12 |

Table 2 is in the same format as Table 1 for the fractal signals generated by the method of Corsini and Saletti.

TABLE 2

| Signal Characteristics | | | M-L | | Embodiment (1) | | Embodiment (2) | |
| --- | --- | --- | --- | --- | --- | --- | --- | --- |
| SNR | N | D | $\hat{D}$ | $\sigma_D$ | $\hat{D}$ | $\sigma_D$ | $\hat{D}$ | $\sigma_D$ |
| 20 | 128 | 1 | 1.56 | .11 | 1.10 | .23 | 1.16 | .05 |
| 20 | 128 | 2 | 2.07 | .09 | 1.63 | .40 | 1.88 | .08 |
| 10 | 128 | 1 | 1.67 | .10 | 1.14 | .28 | 1.33 | .06 |
| 10 | 128 | 2 | 2.01 | .09 | 1.66 | .40 | 1.87 | .10 |
| 5 | 128 | 1 | 1.87 | .12 | 1.16 | .33 | 1.23 | .11 |
| 5 | 128 | 2 | 2.13 | .08 | 1.66 | .40 | 1.88 | .11 |
| 2 | 128 | 1 | 2.08 | .11 | 1.16 | .28 | 1.17 | .10 |
| 2 | 128 | 2 | 2.20 | .07 | 1.62 | .40 | 1.82 | .13 |
| 20 | 64 | 1 | 1.51 | .14 | 1.10 | .26 | 1.25 | .15 |
| 20 | 64 | 2 | 2.11 | .15 | 1.61 | .44 | 1.84 | .11 |
| 10 | 64 | 1 | 1.64 | .16 | 1.13 | .27 | 1.20 | .09 |
| 10 | 64 | 2 | 2.12 | .13 | 1.63 | .42 | 1.74 | .15 |
| 5 | 64 | 1 | 1.83 | .16 | 1.11 | .25 | 1.31 | .07 |
| 5 | 64 | 2 | 2.17 | .13 | 1.60 | .41 | 1.77 | .12 |
| 2 | 64 | 1 | 2.03 | .13 | 1.22 | .34 | 1.22 | .15 |
| 2 | 64 | 2 | 2.23 | .13 | 1.68 | .41 | 1.76 | .18 |

Let us consider the M-L estimator results in Table 2 first. The maximum-likelihood estimates of D provided by the E-M algorithm display significant biases away from the true values, but the variances of their estimates are sufficiently small that, at any but the smallest SNRs considered, one can pick decision thresholds to provide reasonably good false-alarm versus miss-rate performance. Finding a suitable decision threshold becomes much more difficult for 64-point pulses where the error variances are somewhat larger. Another problem occurs due the relationship that as the SNR decreases, the bias will change by significantly more than the small error variances. Thus, to implement a working algorithm, a good estimate of the SNR must be available before setting a decision threshold. A catastrophic failure of the estimation algorithm will occur by not taking this factor into account.

Another problem occurs at M-L, estimates for 128-point pulses at SNR=5 and 10 from Table 2. A threshold for distinguishing between D=1 and D=2, set on the basis of the SNR=10 results, might be set at an estimated Fractal Dimension of 1.85. The exact value depends on the desired false alarm rate, of course; we chose this value for purposes of illustration. For signals at an SNR of 5, however, the mean value of the estimated D is 1.87, and a false alarm rate of at least one-half would result. This presents a serious difficulty for the M-L, approach. While the M-L, algorithm does provide estimates of the signal and noise variances, these were inadequate for the longer pulse lengths that we considered.

A further complication appears when comparing the M-L, results between Tables 1 and 2. While the M-L, algorithm maintains a small estimate variance for both the summed-sinusoidal signals and the recursive filter signals, the biases of the estimates differ greatly in the two cases, to the extent that, for the summed sinusoidal signals, the mean estimated fractal dimension for D=1 signals is greater than the mean estimate for D=2 signals. This suggests that the behavior of the algorithm in the presence of signals that deviate from a particular model can vary considerably, further exacerbating the problem of setting robust thresholds.

The embodiment of the present invention with the neural network operating on the complete wavelet representation produces estimates with slightly larger error variances than does the M-L, technique, but the biases are smaller. More important, the bias does not change significantly with SNR, so that it is unnecessary to update decision thresholds dynamically. While the performance of the estimator degrades with decreasing SNR, as happens generally for any estimation technique, no catastrophic failure as that of the M-L, estimator occurs. Indeed, we found that networks trained on signals of a particular SNR performed well at characterizing signals of different SNRs. The same holds true when we consider the network's performance on different signal types. While the bias of the estimated Fractal Dimension does change from one signal type to the other, the change is not great, and we can diminish the bias further by training the network on a mixture of signals of both types.

The second embodiment of the neural network that operates on Scale variances also produces stable mean estimates in the face either of changing SNR or of different signal types. In addition, the variances of those estimates are of the same order of magnitude as those of the M-L, estimator. In terms of stability of estimator bias and small estimate variance, however, this combination of neural networks and wavelet derived scale variances has the best performance of the three estimators.

The M-L, estimator involves levels of complexity that make its use in a real time system problematic. As noted above, the E-M algorithm iterates to find an estimate of the fractal dimension. In the software version of the E-M algorithm implemented during development of this invention, we set the number of iterations at a fixed value that we determined by examining the convergence behavior on a set of test cases. The need to reduce processing time in a real-time system would necessitate the use of convergence checks, instead of a fixed limit. This means that the time required for the algorithm to form an estimate would be variable, which might constitute a significant problem for system and interface design. Making matters worse is the necessity of finding the zeros of a polynomial within each iteration. This is itself an iterative process and one that, using the root-finding code employed in this simulation, occasionally failed to converge to the required real zero.

The present invention using a neural network performs complex computations during its training and testing phases; but, once satisfactorily trained, the neural network's operation as an estimator is a simple and repeatable sequence of multiplications and additions. While the exact number of connections of the neural network depends on the design of the network, we can give an approximate number of connections for each embodiment as shown in Table 3.

TABLE 3

| Input to neural network | 64-point pulse | 128-point pulse |
|---|---|---|
| Complete wavelet representation | ~400 connections | ~1000 connections |
| Scale Variances | ~15 connections | ~20 connections |

Each connection represents a multiplication and an addition. The operations required to operate the trained network is well within the capability of hardware designs or of reasonably fast DSPs. Note that calculating the Scale variances used in the second technique requires computations equivalent to taking the inner product of a pulse with itself, and performing divisions by powers of two; this increases the number of multiply-and-add steps by approximately 64 for 64-point pulses, and approximately 128 for 128-point pulses. The practical result is that we can implement either embodiment of the neural network estimator in real-time weapon systems that need a small amount of additional hardware.

No analytical signal model will exactly represent the signals a receiver must process in a real-world situation. Algorithm design must take this into account as fully as possible. As noted above, the behavior of the M-L, estimator is highly sensitive to the nature of the signals it processes and this sensitivity becomes reflected in variations of the estimated fractal dimension. This happens because the summed-sinusoidal signals differ somewhat from the "ideal" 1/f processes that the M-L, estimator is designed to handle, and it suggests that processing algorithms based on this or any similar analytical approach may encounter serious difficulties when signals in the real world fail to conform to those hypothesized in the analytical model. The neural networks of the present invention are much less sensitive then the signal model than the M-L estimator. This in itself suggests that the neural network approach is more applicable to a more general variety of signals.

More important, though, is that the neural networks are not the result of an analytic design process. Exposing the neural networks to examples of the signal types of interest trains the networks to recognize and categorize those. Thus, while analytical modeling remains important to the system design and specification process, it is not necessary to the generation of signal models with which to train the network. Rather, we can train the network on collections of real signals of the types that the networks need to categorize.

Other embodiments of the invention will be apparent to those skilled in the art after considering this specification or practicing the disclosed invention. The specification and examples above are exemplary only, with the true scope of the invention being indicated by the following claims.

I claim the following invention:

1. A method for estimating the fractal dimension of an object's fractal surface, comprising the following steps:

receiving reflected electromagnetic signals from an object's fractal surface;

decomposing said electromagnetic signals into Scales of scaling basis coefficients and wavelet basis coefficients using a pyramid transform in conjunction a with Discrete Wavelet Transform to calculate said scaling basis coefficients and said wavelet basis coefficients; and estimating the fractal dimension of the fractal surface of said object.

2. The method of claim 1 wherein said step of decomposing further comprises the steps of:

forming a Basis of said scaling basis coefficients for each said Scale $$\left\{ c^{j+1}(k) : k = 0, \ldots, \left( \frac{N}{2^{j+1}} \right) - 1 \right\}$$

representing said electromagnetic signals in subspace $\{V_j : j = 0, 1, 2, \ldots\}$ using $$c^{j+1}(k) = \sum_n h(n-2k)c^j(n) = \sum_n h(n)c^j(2k-n)$$

where:

$$h(n) = 2^{-1/2} \int dx \Phi\left( \frac{1}{2} x \right) \Phi(x-n); \text{ and}$$

forming a Basis of said wavelet basis coefficients for each said Scale $$\left\{ d^{j+1}(k) : k = 0, \ldots, \left( \frac{N}{2^{j+1}} \right) - 1 \right\}$$

representing said electromagnetic signals in subspace $\{O_j : j = 0, 1, 2, \ldots\}$ using $$d^{j+1}(k) = \sum_n g(n-2k)c^j(n) = \sum_n g(n)c^j(2k-n)$$

where:

$$g(n) = 2^{-1/2} \int dx \Psi\left( \frac{1}{2} x \right) \Psi(x-n).$$

3. The method of claim 1 further comprising the step of computing the Variance of said wavelet basis coefficients at each said Scale, said step of computing said Variance precedes said step of estimating the fractal dimension.

4. The method of claim 3 wherein said step of computing said Variance further comprises the following equation:

$$VarS_j = \frac{1}{2^{M-j}} \sum_{k=0}^{2^{M-j}} (d_k^j - m_j)^2$$

where $m_j$ comprises the mean of said wavelet basis coefficients at said Scale j.

5. The method of claim 3 wherein said step of decomposing further comprises the following steps:

forming a Basis of said scaling basis coefficients for each said Scale $$\left\{ c^{j+1}(k) : k = 0, \ldots, \left( \frac{N}{2^{j+1}} \right) - 1 \right\}$$

representing said electromagnetic signals in subspace $\{V_j : j = 0, 1, 2, \ldots\}$ using $$c^{j+1}(k) = \sum_n h(n-2k)c^j(n) = \sum_n h(n)c^j(2k-n)$$

where:

$$h(n) = 2^{-1/2} \int dx \Phi\left( \frac{1}{2} x \right) \Phi(x-n); \text{ and}$$

forming a Basis of said wavelet basis coefficients for each said Scale $$\left\{ d^{j+1}(k) : k = 0, \ldots, \left( \frac{N}{2^{j+1}} \right) - 1 \right\}$$

representing said electromagnetic signals in subspace $\{O_j : j = 0, 1, 2, \ldots\}$ using $$d^{j+1}(k) = \sum_n g(n-2k)c^j(n) = \sum_n g(n)c^j(2k-n)$$

where:

$$g(n) = 2^{-1/2} \int dx \Psi\left( \frac{1}{2} x \right) \Psi(x-n).$$

6. The method of claim 5 wherein said step of computing said Variance further comprises the following equation:

$$VarS_j = \frac{1}{2^{M-j}} \sum_{k=0}^{2^{M-j}} (d_k^j - m_j)^2$$

where $m_j$ comprises the mean of said wavelet basis coefficients at said Scale j.

7. Apparatus for estimating the fractal dimension of an object's fractal surface, comprising:

an electromagnetic signal reflected from an object's fractal surface;

means for decomposing said electromagnetic signal into Scales of scaling basis coefficients and wavelet basis coefficients using a pyramid transform in conjunction with a Discrete Wavelet Transform to calculate said scaling basis coefficients and said wavelet basis coefficients; and means for estimating the fractal dimension of the fractal surface of said object.

8. The apparatus of claim 7 wherein said means for decomposing further comprises:

means for forming a Basis of said scaling basis coefficients for each said Scale $$\left\{ c^{j+1}(k) : k = 0, \ldots, \left( \frac{N}{2^{j+1}} \right) - 1 \right\}$$

representing said electromagnetic signals in subspace $\{V_j : j = 0, 1, 2, \ldots\}$ using $$c^{j+1}(k) = \sum_n h(n-2k)c^j(n) = \sum_n h(n)c^j(2k-n)$$

where:

$$h(n) = 2^{-1/2} \int dx \Phi\left( \frac{1}{2} x \right) \Phi(x-n); \text{ and}$$

means for forming a Basis of said wavelet basis coefficients for each said Scale $$\left\{ d^{j+1}(k) : k = 0, \ldots, \left( \frac{N}{2^{j+1}} \right) - 1 \right\}$$

representing said electromagnetic signals in subspace $\{O_j : j = 0, 1, 2, \ldots\}$ using $$d^{j+1}(k) = \sum_n g(n-2k)c^j(n) = \sum_n g(n)c^j(2k-n)$$

where:

$$g(n) = 2^{-1/2} \int dx \Psi\left( \frac{1}{2} x \right) \Psi(x-n).$$

9. The apparatus of claim 7 further comprising means for computing the Variance of said wavelet basis coefficients at each said Scale.

10. The apparatus of claim 9 wherein said means for computing said Variance further comprises the following equation:

$$VarS_j = \frac{1}{2^{M-j}} \sum_{k=0}^{2^{M-j}} (d_k^j - m_j)^2$$

where $m_j$ comprises the mean of said wavelet basis coefficients at said Scale j.

11. The apparatus of claim 9 wherein said means for decomposing further comprises:

means for forming a Basis of said scaling basis coefficients for each said Scale $$\left\{ c^{j+1}(k): k=0, \ldots, \left(\frac{N}{2^{j+1}}\right) - 1 \right\}$$

representing said electromagnetic signals in subspace $\{V_j: j=0,1,2,\ldots\}$ using $$c^{j+1}(k) = \sum_n h(n-2k)c^j(n) = \sum_n h(n)c^j(2k-n)$$

where:

$$h(n) = 2^{-1/2} \int dx \Phi\left(\frac{1}{2}x\right) \Phi(x-n); \text{ and}$$

means for forming a Basis of said wavelet basis coefficients for each said Scale $$\left\{ d^{j+1}(k): k=0, \ldots, \left(\frac{N}{2^{j+1}}\right) - 1 \right\}$$

representing said electromagnetic signals in subspace $\{O_j: j=0,1,2,\ldots\}$ using $$d^{j+1}(k) = \sum_n g(n-2k)c^j(n) = \sum_n g(n)c^j(2k-n)$$

where:

$$g(n) = 2^{-1/2} \int dx \Psi\left(\frac{1}{2}x\right) \Psi(x-n).$$

12. The apparatus of claim 11 wherein said means for computing said Variance further comprises the following equation:

$$VarS_j = \frac{1}{2^{M-j}} \sum_{k=0}^{2^{M-j}} (d_k^j - m_j)^2$$

where $m_j$ comprises the mean of said wavelet basis coefficients at said Scale j.

13. A program storage device readable by a machine, tangibly embodying a program of instructions executable by the machine to perform method steps for a method of estimating the fractal dimension of an object's fractal surface, said method steps comprising:

receiving reflected electromagnetic signals from an object's fractal surface;

decomposing said signals into Scales of scaling basis coefficients and wavelet basis coefficients using a pyramid transform in conjunction a with Discrete Wavelet Transform to calculate said scaling basis coefficients and said wavelet basis coefficients; and estimating the fractal dimension of the fractal surface of said object.

14. The storage device of claim 13 wherein said step of decomposing further comprises the steps of:

forming a Basis of said scaling basis coefficients for each said Scale $$\left\{ c^{j+1}(k): k=0, \ldots, \left(\frac{N}{2^{j+1}}\right) - 1 \right\}$$

representing said electromagnetic signals in subspace $\{V_j: j=0,1,2,\ldots\}$ using $$c^{j+1}(k) = \sum_n h(n-2k)c^j(n) = \sum_n h(n)c^j(2k-n)$$

where:

$$h(n) = 2^{-1/2} \int dx \Phi\left(\frac{1}{2}x\right) \Phi(x-n); \text{ and}$$

forming a Basis of said wavelet basis coefficients for each said Scale $$\left\{ d^{j+1}(k): k=0, \ldots, \left(\frac{N}{2^{j+1}}\right) - 1 \right\}$$

representing said electromagnetic signals in subspace $\{O_j: j=0,1,2,\ldots\}$ using $$d^{j+1}(k) = \sum_n g(n-2k)c^j(n) = \sum_n g(n)c^j(2k-n)$$

where:

$$g(n) = 2^{-1/2} \int dx \Psi\left(\frac{1}{2}x\right) \Psi(x-n).$$

15. The storage device of claim 13 further comprising the step of computing the Variance of said wavelet basis coefficients at each said Scale, said step of computing said Variance precedes said step of estimating the fractal dimension.

16. The storage device of claim 15 wherein said step of computing said Variance further comprises the following equation:

$$VarS_j = \frac{1}{2^{M-j}} \sum_{k=0}^{2^{M-j}} (d_k^j - m_j)^2$$

where $m_j$ comprises the mean of said wavelet basis coefficients at said Scale j.

17. The storage device of claim 15 wherein said step of decomposing further comprises the following steps:

forming a Basis of said scaling basis coefficients for each said Scale $$\left\{ c^{j+1}(k): k=0, \ldots, \left(\frac{N}{2^{j+1}}\right) - 1 \right\}$$

representing said electromagnetic signals in subspace $\{V_j: j=0,1,2,\ldots\}$ using $$c^{j+1}(k) = \sum_n h(n-2k)c^j(n) = \sum_n h(n)c^j(2k-n)$$

where:

$$h(n) = 2^{-1/2} \int dx \Phi\left(\frac{1}{2}x\right) \Phi(x-n); \text{ and}$$

forming a Basis of said wavelet basis coefficients for each said Scale $$\left\{ d^{j+1}(k) : k = 0, \ldots, \left(\frac{N}{2^{j+1}}\right) - 1 \right\}$$

representing said electromagnetic signals in subspace $\{O_j : j = 0, 1, 2, \ldots\}$ using $$d^{j+1}(k) = \sum_n g(n - 2k)c^j(n) = \sum_n g(n)c^j(2k - n)$$

where:

$$g(n) = 2^{-1/2} \int dx \Psi\left(\frac{1}{2} x\right) \Psi(x - n).$$

18. The storage device of claim 17 wherein said step of computing said Variance further comprises the following equation:

$$VarS_j = \frac{1}{2^{M-j}} \sum_{k=0}^{2^{M-j}} (d_k^j - m_j)^2$$

where $m_j$ comprises the mean of said wavelet basis coefficients at said Scale j.

* * * * *

UNITED STATES PATENT AND TRADEMARK OFFICE
CERTIFICATE OF CORRECTION

PATENT NO. : 5,612,700
DATED : March 18, 1997
INVENTOR(S) : Michael Tucker

It is certified that error appears in the above-indentified patent and that said Letters Patent is hereby corrected as shown below:

Column 2, line 8, after "by" remove "a".

Column 2, line 56, "produce" should be --produces--.

Column 3, line 55, remove "as".

Column 7, line 6, after "that" insert --c°--.

Column 7, line 14, "(.)" should be --<·>--.

Column 7, line 14, "$f_{vt}$" should be --$f_{v1}$--.

Column 9, line 18, "C(t)<0" should be --C(t)≠0--

Column 10, line 15, after "where" insert --$m_j$--.

Column 10, line 38, after "easily" insert --use to --.

Column 10, line 59, after "signal" insert --.--.

Column 10, line 63, "form" should be --from--.

Column 11, line 42, remove ",".

Column 11, line 52, after "1988)" insert --.--.

Column 12, line 60, remove ",".

Column 13, line 2, "M-L, approach." should be --M-L approach.--.

Column 13, line 2, "M-L, algorithm" should be --M-L algorithm--.

Column 13, line 6, remove ",".

UNITED STATES PATENT AND TRADEMARK OFFICE
CERTIFICATE OF CORRECTION

PATENT NO. : 5,612,700
DATED : March 18, 1997
INVENTOR(S) : Michael Tucker

It is certified that error appears in the above-indentified patent and that said Letters Patent is hereby corrected as shown below:

Column 13, line 7, remove ",".

Column 13, line 20, remove ",".

Column 13, line 26, remove ",".

Column 13, line 43, remove ",".

Column 14, line 24, remove ",".

Column 14, line 29, remove ",".

Column 14, line 35, "then the signal model than" should be --than the signal model of--.

In the claims:

Column 14, line 58, "conjunction a with" should be --conjunction with a--.

Column 17, line 58, "conjunction a with" should be --conjunction with a--.

Signed and Sealed this

Fourteenth Day of October, 1997

Attest:

BRUCE LEHMAN

Attesting Officer

Commissioner of Patents and Trademarks